(12) United States Patent
Jirskog et al.

(10) Patent No.: US 9,389,113 B2
(45) Date of Patent: Jul. 12, 2016

(54) LOW POWER RADAR LEVEL GAUGE SYSTEM

(71) Applicant: Rosemount Tank Radar AB, Gothenburg (SE)

(72) Inventors: Anders Jirskog, Huskvarna (SE); Mikael Kleman, Vreta Kloster (SE); Lars Ove Larsson, Linkoping (SE)

(73) Assignee: ROSEMOUNT TANK RADAR AB, Gothenburg (SE)

( * ) Notice: Subject to any disclaimer, the term of this patent is extended or adjusted under 35 U.S.C. 154(b) by 363 days.

(21) Appl. No.: 14/198,287

(22) Filed: Mar. 5, 2014

(65) Prior Publication Data
US 2015/0253176 A1 Sep. 10, 2015

(51) Int. Cl.
| | |
|---|---|
| *G01F 23/284* | (2006.01) |
| *G01S 13/88* | (2006.01) |
| *G01S 13/08* | (2006.01) |
| *G01S 7/35* | (2006.01) |
| *G01S 13/34* | (2006.01) |
| *G01S 7/00* | (2006.01) |
| *G01S 7/02* | (2006.01) |

(52) U.S. Cl.
CPC ............... *G01F 23/284* (2013.01); *G01S 7/35* (2013.01); *G01S 13/08* (2013.01); *G01S 13/343* (2013.01); *G01S 13/88* (2013.01); *G01S 7/003* (2013.01); *G01S 2007/027* (2013.01)

(58) Field of Classification Search
CPC ....... G01F 23/284; G01S 13/08; G01S 13/32; G01S 13/34; G01S 13/343; G01S 13/88; G01S 7/003; G01S 2007/027

USPC .......................................................... 342/124
See application file for complete search history.

(56) References Cited

U.S. PATENT DOCUMENTS

| | | | |
|---|---|---|---|
| 4,737,791 | A | 4/1988 | Jean et al. |
| 4,931,799 | A | 6/1990 | Wen et al. |
| 5,799,534 | A | 9/1998 | van der Pol |
| 6,114,987 | A | 9/2000 | Bjornholt |
| 6,317,074 | B1 | 11/2001 | Johnson |
| 6,606,052 | B1 | 8/2003 | Miyahara |
| 7,737,880 | B2 | 6/2010 | Vacanti |

(Continued)

FOREIGN PATENT DOCUMENTS

| | | |
|---|---|---|
| DE | 19531540 | 2/1997 |
| EP | 2 026 098 | 2/2009 |

(Continued)

OTHER PUBLICATIONS

"Auswertemethoden zur Prazisionsentfernungsmessung mit FMCW—Systemen und deren Anwendung im Mikrowellenbereich", by Stolle et al., TM Technisches Messen, Feb. 1995.

(Continued)

*Primary Examiner* — Peter Bythrow
(74) *Attorney, Agent, or Firm* — Westman, Champlin & Koehler, P.A.

(57) ABSTRACT

The present invention relates to a radar level gauge system comprising a signal propagation device; a microwave signal source; a microwave signal source controller; a mixer configured to combine a transmit signal from the microwave signal source and a reflection signal from the surface to form an intermediate frequency signal; and processing circuitry coupled to the mixer and configured to determine the filling level based on the intermediate frequency signal.

47 Claims, 7 Drawing Sheets

(56) References Cited

U.S. PATENT DOCUMENTS

| | | | |
|---|---|---|---|
| 7,952,514 B2 | 5/2011 | Nilsson | |
| 8,477,064 B2 | 7/2013 | Nilsson | |
| 8,866,667 B2 | 10/2014 | Vacanti | |
| 8,872,694 B2* | 10/2014 | Edvardsson | G01F 23/284 342/124 |
| 8,922,371 B2 | 12/2014 | Mohamadi | |
| 9,024,808 B2* | 5/2015 | Kleman | G01F 23/284 342/118 |
| 9,291,443 B2* | 3/2016 | Kleman | G01S 7/35 |
| 2003/0052813 A1 | 3/2003 | Natsume | |
| 2004/0150548 A1 | 8/2004 | Walmsley | |
| 2007/0152871 A1* | 7/2007 | Puglia | G01S 7/352 342/70 |
| 2008/0100500 A1* | 5/2008 | Kondoh | G01S 7/35 342/109 |
| 2008/0180180 A1 | 7/2008 | Musch | |
| 2011/0006811 A1 | 1/2011 | Gerding | |
| 2011/0093129 A1 | 4/2011 | Nilsson et al. | |
| 2012/0169528 A1* | 7/2012 | Edvardsson | G01F 23/284 342/124 |
| 2012/0299767 A1* | 11/2012 | Kleman | G01F 23/284 342/124 |
| 2013/0076559 A1* | 3/2013 | Edvardsson | G01S 13/36 342/124 |
| 2014/0002274 A1 | 1/2014 | Nilsson et al. | |
| 2014/0022113 A1 | 1/2014 | Nogueira-Nine | |
| 2015/0084808 A1* | 3/2015 | Vacanti | G01S 7/41 342/122 |

FOREIGN PATENT DOCUMENTS

| | | |
|---|---|---|
| EP | 2 680 605 | 1/2014 |
| WO | WO 2004/005960 | 1/2004 |
| WO | WO 2012/159682 | 11/2012 |

OTHER PUBLICATIONS

"Ramp Sequence Analysis to Resolve Multi Target Scenarios for a 77-GHz FMCW Radar Sensor" by Pourvoyeur et al., International Conference on IEEE Piscataway, NJ, Jun. 30, 2008.

"Automotive MM-Wave Radar: Status and Trends in System Design and Technology" by Wenger, The Institute of Electrical Engineers, 1998.

Notification of Transmittal of the International Search Report and the Written Opinion of the International Searching Authority, from PCT/EP2015/054471, dated Aug. 21, 2015.

"Fully Integrated Automotive Radar Sensor with Versatile Resolution", Metz et al., IEEE MTT-S Digest, May 20, 2001.

"Automotive MM-Wave Radar: Status and Trends in System Design and Technology", Wenger, The Institution of Electrical Engineers, Feb. 9, 1998.

Notification of Transmittal of the International Search Report and the Written Opinion of the International Searching Authority, PCT/EP2015/054464, dated May 29, 2015.

"A Frequency Agile X-Band Homodyne GaAs MMIC Transceiver with a Synthesized Phase Locked Source for Automotive Collision Avoidance Radar", by Woo et al., IEEE Microwave and Millimeter-Wave Monolithic Circuits Symposium, 1994, pp. 129-132.

Office Action from U.S. Appl. No. 14/198,272, dated Feb. 26, 2016.

\* cited by examiner

LOW POWER RADAR LEVEL GAUGE SYSTEM

TECHNICAL FIELD OF THE INVENTION

The present invention relates to a radar level gauge system, and to a method of determining a filling level of a product in a tank.

TECHNICAL BACKGROUND

Since radar level gauging was commercialized in the 1970's and 1980's, frequency modulated continuous wave (FMCW) gauging has been the dominating measuring principle for high accuracy applications. An FMCW-type filling level measurement comprises transmitting into the tank a signal which is swept over a frequency range in the order of a few GHz. For example, the signal can be in the range 24-27 GHz, or 9-10.5 GHz. The transmitted signal is reflected by the surface of the product in the tank (or by any other impedance transition) and an echo signal, which has been delayed a certain time, is returned to the gauge. The echo signal is combined with the transmitted signal in a mixer to generate a combined signal, having a frequency equal to the frequency change of the transmitted signal that has taken place during the time delay. If a linear sweep is used, this frequency, which is also referred to as an intermediate frequency (IF), is proportional to the distance to the reflecting surface. The combined signal from the mixer is often referred to as an intermediate frequency signal or an IF-signal.

More recently, the FMCW principle has been improved, and today typically involves transmitting not a continuous frequency sweep but a signal with stepped frequency and practically constant amplitude—a stepped frequency sweep. When the transmitted and received signals are mixed, each frequency step will provide one constant piece of a piecewise constant IF-signal. The piecewise constant IF-signal is sampled and the sampled signal is transformed to the frequency plane, for example using FFT, in order to identify frequency components of the IF-signal. The frequency components may then be translated to distances, for example in the form of an echo curve or similar.

Although highly accurate, conventional FMCW systems—continuous as well as stepped—are relatively power hungry, which makes them less suitable for applications where the power (and/or energy) is limited. Examples of such applications include field devices powered by a two-wire interface, such as a 4-20 mA loop, and wireless devices powered by an internal energy source (e.g. a battery or a solar cell).

For applications with limited available energy and/or power, also the cost and size of a level measuring system are often crucial parameters. Such applications may, for example, be found in the process industry.

To allow such applications to benefit from the high performance of FMCW-type radar level gauging, it would be desirable to provide for a more compact and cost-efficient FMCW-type radar level gauge system, which is also capable of operating on the limited available power/energy with a reasonable update frequency.

SUMMARY

In view of the above, a general object of the present invention is to provide for an improved radar level gauge system enabling accurate filling level determination for applications with severely limited supply of energy and/or power. It is a further object of embodiments of the present invention to achieve this at a lower cost than with currently available radar level gauge systems of the FMCW-type.

According to a first aspect of the present invention, it is therefore provided a radar level gauge system for determining the filling level of a product in a tank, comprising: a signal propagation device arranged to propagate an electromagnetic transmit signal towards a surface of the product and to return an electromagnetic reflection signal resulting from reflection of the electromagnetic transmit signal at the surface; a microwave signal source coupled to the signal propagation device and controllable to generate the electromagnetic transmit signal; a microwave signal source controller coupled to the microwave signal source and configured to control the microwave signal source to generate the transmit signal in the form of a measurement sweep comprising a time sequence of discrete and mutually different frequency steps defining a bandwidth of the transmit signal; a mixer coupled to the microwave signal source and to the signal propagation device, and configured to combine the transmit signal and the reflection signal to form an intermediate frequency signal; a sampler coupled to the mixer and configured to sample the intermediate frequency signal at a plurality of sampling times during the measurement sweep; and processing circuitry coupled to the mixer and configured to determine the filling level based on the intermediate frequency signal, wherein the microwave signal source controller and the sampler are controllable independently of each other, in such a way that a duration of each of the frequency steps comprised in the measurement sweep can be made different from a sampling time interval between consecutive ones of the sampling times.

According to various embodiments of the radar level gauge system according to the first aspect of the present invention, the formation of the measurement sweep and the sampling interval can be independently controlled to tailor the operation of the radar level gauge system for an optimal combination of measurement performance and power/energy consumption of different applications.

For example, the microwave signal source controller and the sampler may advantageously be controlled in such a way that the duration of each of the frequency steps of the measurement sweep is substantially shorter than the sampling time interval.

This may reduce the risk of distortion of the intermediate frequency signal due to large frequency steps, which improves the reliability and/or accuracy of measurement, in particular for long measurement distances.

According to various embodiments, at least said microwave signal source and said mixer may be comprised in an integrated microwave circuit.

An integrated microwave circuit should, in the context of the present application, be understood to mean a type of monolithic (single die) integrated circuit (IC) device that operates at microwave frequencies (such as about 300 MHz to about 300 GHz).

An integrated microwave circuit is often referred to as an MMIC (Monolithic Microwave Integrated Circuit).

MMICs may, for example, be fabricated using SiGe, or a III-V compound semiconductor such as GaAs or InP.

The integrated microwave circuit may advantageously be comprised in a multi chip module together with one or several other integrated circuits to provide more functionality to a single electronic component (defined by a single electronic component package).

The use of an integrated microwave circuit contributes to a significantly reduced cost of the radar level gauge system according to various embodiments of the present invention.

Firstly, it has been realized that a key factor to reduce the cost of a currently available FMCW-type radar level gauge system is to reduce the size of the mechanical parts thereof, since these are often precision manufactured from high quality materials, such as high-grade stainless steel. Another important factor is the production yield, in particular of the microwave signal source (and the mixer).

Secondly, the present inventors have realized that both a reduction in size and an increase in the production yield can be achieved by providing at least the microwave signal source and the mixer in the form of a single integrated microwave circuit (MMIC). Hereby, a large number of discrete components can be replaced by a single component or a few components.

However, currently available integrated microwave circuits comprising a microwave signal source are often intended for communication applications where the phase noise should be very low or for automotive applications, where the supply of energy/power is not an issue. It would therefore appear that integrated microwave circuits are not suited for the desired applications, where energy/power is scarce.

Because of the relatively short distance involved in radar level gauging for tanks, the requirements on phase noise is not as strict as for other radar applications for greater ranges. Furthermore, a reduction in the requirement on phase noise allows the microwave signal source to be designed to consume less power. Accordingly, configuring the microwave signal source to exhibit a phase noise greater than or equal to −70 dBc/Hz @ 100 kHz offset from a carrier frequency for the transmit signal allows for reduced power consumption, while still providing for sufficient measurement performance for the measurement range of the radar level gauge system.

Hence, the present inventors have surprisingly found that, using an integrated microwave circuit comprising at least the microwave signal source and the mixer, wherein the microwave signal source is configured to exhibit a phase noise greater than or equal to −70 dBc/Hz @ 100 kHz offset from a carrier frequency for the transmit signal, allows a significant reduction in the energy/power consumption of the radar level gauge system while maintaining sufficient performance, for example with respect to update rate. For instance, a filling level measurement may be performed one time per second.

Accordingly, all of the above-mentioned inventive insights contribute synergistically to provide for high accuracy FMCW-type radar level gauging using a compact and cost-efficient radar level gauge system, that can still be powered using a two-wire communication interface or a local energy source.

Advantageously, the microwave circuitry and measurement electronics components may be mounted on the same circuit board, which facilitates production and reduces cost.

According to various embodiments, the mixer may be provided in the form of any circuitry capable of combining the transmit signal and the reflection signal in such a way that an intermediate frequency signal is formed that is indicative of the phase difference between the transmit signal and the reflection signal.

One example of a simple and compact mixer is the so-called single diode leaky mixer.

In various embodiments, the electromagnetic transmit signal may have substantially constant amplitude. The power of the transmit signal may be in the range of −50 dBm to +5 dBm, typically 0 dBm, i e 1 mW.

Tests and theoretical calculations show that a sweep duration of about 10 ms should be sufficiently short to fulfill the energy/power consumption criteria for a two-wire current loop system, which is currently seen as the most challenging application.

In various embodiments of the radar level gauge system, the microwave signal source controller may be configured to control the microwave signal source to generate the measurement sweep having a time duration of less than 5 ms.

This may provide for even lower energy consumption because of a shorter on-time of the microwave signal source.

Moreover, the radar level gauge system according to various embodiments of the present invention may further comprise a sampler coupled to the mixer and configured to sample the intermediate frequency signal at less than 500 sampling times during the measurement sweep.

This provides for a further reduction in the energy consumption of the radar level gauge system, because the time used for processing the intermediate frequency signal can be reduced.

According to various embodiments of the present invention, the bandwidth of the transmit signal may be at least 1 GHz, whereby a sufficient resolution can be achieved for most applications.

According to various embodiments, furthermore, the microwave signal source controller may advantageously comprise PLL circuitry and a crystal oscillator coupled to the PLL circuitry.

The PLL (phase lock loop or phase-locked loop) circuitry may, for example, be a so-called analog or linear PLL (LPLL), a digital PLL (DPLL), an all digital PLL (ADPLL) or a software PLL (SPLL).

The PLL circuitry may advantageously be comprised in the same electronic component package as the integrated microwave circuit, and the crystal oscillator may be arranged outside the electronic component package.

In various embodiments, the microwave signal source controller may further comprise a low pass filter connected between the PLL and the microwave signal source.

The low pass filter may advantageously be arranged outside the electronic component package enclosing the integrated microwave circuit.

According to various embodiments, the radar level gauge system of the present invention may advantageously be controllable between an active state in which the microwave signal source is controlled to generate the transmit signal, and an idle state in which no transmit signal is generated.

The radar level gauge system may further comprise an energy store configured to store energy when the radar level gauge system is in the idle state and provide energy to the microwave signal source when the radar level gauge system is in the active state.

The local energy store may, for example, comprise a battery, a capacitor, and/or a super capacitor.

Moreover, the radar level gauge system may further comprise wireless communication circuitry, such as a radio transceiver, for wireless communication with a remote system.

It should be noted that the signal propagation device may be any suitable radiating antenna or transmission line probe. Examples of antennas include a horn antenna, a rod antenna, an array antenna and a parabolic antenna, etc. Examples of transmission line probes include a single line probe (Goubau probe), a twin line probe and a coaxial probe etc.

It should also be noted that the processing circuitry may be provided as one device or several devices working together.

According to a second aspect of the present invention, it is provided a radar level gauge system for determining the filling level of a product in a tank, comprising: a signal propagation device arranged to propagate an electromagnetic transmit signal towards a surface of the product and to return an electromagnetic reflection signal resulting from reflection of the electromagnetic transmit signal at the surface; a microwave signal source coupled to the signal propagation device and controllable to generate the electromagnetic transmit signal; a local energy store configured to store energy at times when no transmit signal is generated and to provide energy to the microwave signal source when the transmit signal is generated; a microwave signal source controller coupled to the microwave signal source and configured to control the microwave signal source to generate the transmit signal in the form of a measurement sweep starting at a first frequency being the highest frequency of the measurement sweep when the local energy store is capable of providing a first voltage, and ending at a second frequency being the lowest frequency of the measurement sweep when the local energy store has been partly discharged and is capable of providing a second voltage lower than the first voltage; a mixer coupled to the microwave signal source and to the signal propagation device, and configured to combine the transmit signal and the reflection signal to form an intermediate frequency signal; and processing circuitry coupled to the mixer and configured to determine the filling level based on the intermediate frequency signal.

Various embodiments of the radar level gauge system according to the second aspect of the present invention enable improved operation of the radar level gauge system in embodiments where energy is stored in an energy store between measurement operations. Typically, the microwave signal source needs a higher input voltage to provide a high frequency than to provide a low frequency—this is particularly the case for a microwave signal source comprising a so-called voltage controlled oscillator (VCO). If energy storage, for example using one or several capacitor(s) is utilized, the capability to provide a sufficiently high voltage for the highest frequency of the frequency sweep will be greater in the beginning of the measurement operation than at the end of the measurement operation.

Further embodiments of, and effects obtained through this second aspect of the present invention are largely analogous to those described above for the first aspect of the invention.

According to a third aspect of the present invention, it is provided a radar level gauge system for determining the filling level of a product in a tank, the radar level gauge system being controllable between at least a first measurement mode and a second measurement mode, the radar level gauge system comprising: a signal propagation device arranged to propagate an electromagnetic transmit signal towards a surface of the product and to return an electromagnetic reflection signal resulting from reflection of the electromagnetic transmit signal at the surface; a microwave signal source coupled to the signal propagation device and controllable to generate the electromagnetic transmit signal; a microwave signal source controller coupled to the microwave signal source and configured to: control, when the radar level gauge system is in the first measurement mode, the microwave signal source to generate a first measurement sweep having a first time duration and a first bandwidth; and control, when the radar level gauge system is in the second measurement mode, the microwave signal source to generate a second measurement sweep having a second time duration and a second bandwidth, at least one of the second time duration and the second bandwidth being substantially different from the first time duration and the first bandwidth, respectively; a mixer coupled to the microwave signal source and to the signal propagation device, and configured to combine the transmit signal and the reflection signal to form an intermediate frequency signal; and processing circuitry coupled to the mixer and configured to determine the filling level based on the intermediate frequency signal.

For any sampled FMCW system (continuous sweep or stepped), the maximum measuring distance (range), L, is determined as:

$$L = Nc/4B,$$

where N is the number of samples, c is the speed of light, and B is the bandwidth of the measurement sweep.

An increased bandwidth B gives an improved resolution, but from the above relation it is clear that an increased bandwidth B will lead to a reduced range L, unless the number of samples N is increased. However, as the sampling frequency is fixed at a reasonable value from an A/D conversion standpoint, any increase of the number of samples will inevitably lead to an increased sweep time.

For a given measurement range, there is thus a tradeoff between resolution (bandwidth) on the one hand, and power consumption (sweep time) on the other.

By providing a radar level gauge system that is controllable between different sweep modes as outlined above, different tradeoffs can, for instance, be made for different intended measurement ranges. In applications where available power is very scarce, such as the loop-powered or battery-powered radar level gauge systems mentioned in the Background section, the time durations of the measurement sweep may be substantially the same in the different modes, and the bandwidth may be tuned to allow for an increased measurement range at the expense of measurement resolution. This extends the number of applications in which embodiments of the radar level gauge system can be utilized.

Embodiments of, and effects obtained through this third aspect of the present invention are largely analogous to those described above for the first and second aspects of the invention.

In summary, the present invention thus relates to a radar level gauge system comprising a signal propagation device; a microwave signal source; a microwave signal source controller; a mixer configured to combine a transmit signal from the microwave signal source and a reflection signal from the surface to form an intermediate frequency signal; and processing circuitry coupled to the mixer and configured to determine the filling level based on the intermediate frequency signal.

BRIEF DESCRIPTION OF THE DRAWINGS

These and other aspects of the present invention will now be described in more detail, with reference to the appended drawings showing a currently preferred embodiment of the invention, wherein:

FIG. 2a is a block diagram schematically illustrating the radar level gauge system in FIG. 1a;

FIG. 4a is a schematic plane view of the measurement module comprised in the radar level gauge system in FIG. 3, FIG. 4b schematically shows the transceiver MCM (multichip module) comprised in the measurement module in FIG. 4a;

DETAILED DESCRIPTION OF EXAMPLE EMBODIMENTS OF THE INVENTION

In the present detailed description, various embodiments of the radar level gauge system according to the present invention are mainly discussed with reference to a radar level gauge system comprised in a process monitoring system and connected to a remote host by means of a two-wire 4-20 mA communication loop which is also used for providing power to the radar level gauge system, and to a battery-powered radar level gauge system with wireless communication capabilities.

It should be noted that this by no means limits the scope of the present invention, which equally well includes, for example, radar level gauge systems that are not included in a process management system or radar level gauge systems that are not loop-powered or battery-powered.

Figure 1A:
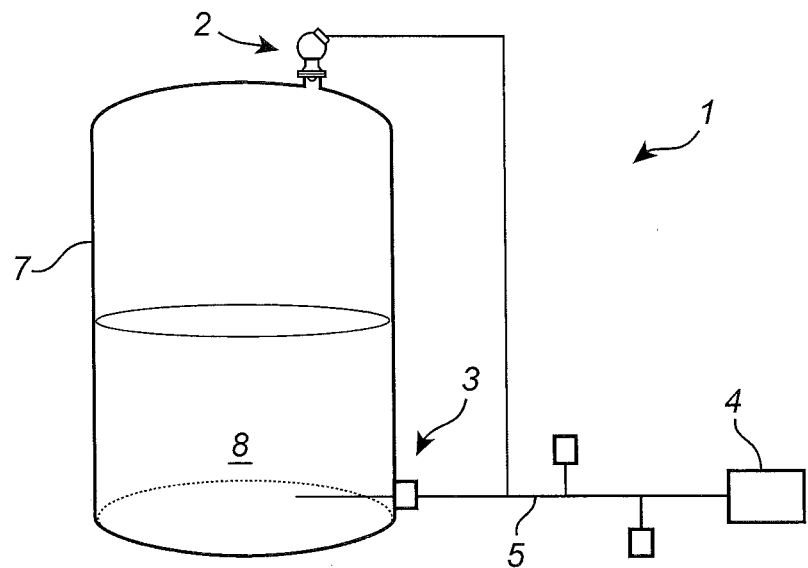
FIG. 1a schematically shows a process monitoring system comprising a radar level gauge system according to a first example embodiment of the present invention.

FIG. 1a schematically shows a process monitoring system 1 comprising a plurality of field devices, including a first embodiment of a radar level gauge system 2 and a temperature sensing device 3 connected to a host system 4 through a communication line 5 in the form of a 4-20 mA current loop. Further field devices connected to the communication line 5 are schematically indicated as boxes.

The radar level gauge system 2 and the temperature sensor 3 are both arranged on a tank containing a product 8 to be gauged.

In addition to providing signals on the current loop, typically in the form of a current value being indicative of a measurement value, the field devices may be powered using the current provided by the current loop 5. As has been previously discussed further above in the Background and Summary sections, this severely limits the power that is available for operation of the field devices, in particular for active field devices, such as the radar level gauge system 2 in FIG. 1a.

Following voltage conversion to the operating voltage(s) of the radar level gauge system 2, less than 30 mW may be available for the operation of the radar level gauge system.

As a consequence, FMCW-type radar level gauge systems have so far not been widely used in loop-powered applications, but so-called pulsed radar level gauge systems have instead been deployed. Even for such low-power pulsed radar level gauge systems, measures have been taken to make more power available when needed in loop-powered applications. For instance, at least parts of the radar level gauge system have been operated intermittently and energy has been stored during inactive or idle periods to be used during active periods.

Solutions for intermittent operation and energy storage are, for example, described in U.S. Pat. No. 7,952,514, U.S. Pat. No. 8,477,064 and U.S. Ser. No. 12/603,048, each of which is hereby incorporated by reference in its entirety.

Figure 1B:
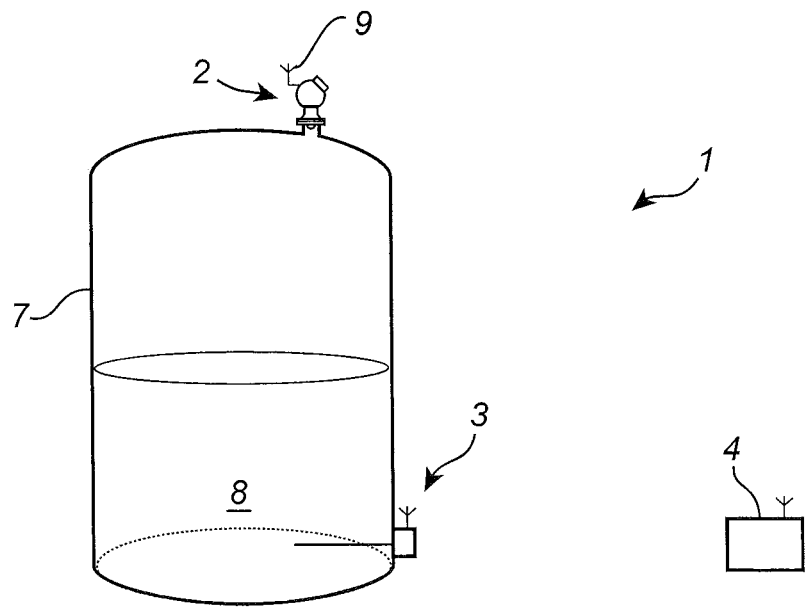
FIG. 1b schematically shows a process monitoring system comprising a radar level gauge system according to a second example embodiment of the present invention.

FIG. 1b schematically shows a process monitoring system 1 comprising a plurality of field devices, including a second embodiment of a radar level gauge system 2 and a temperature sensing device 3 that are wirelessly connected to the host system 4. In this second embodiment, the radar level gauge system is powered by a local energy store, such as a battery with a capacity greater than 0.5 Ah, and comprises a communication antenna 9 to allow wireless communication with the host system 4.

Figure 2A:
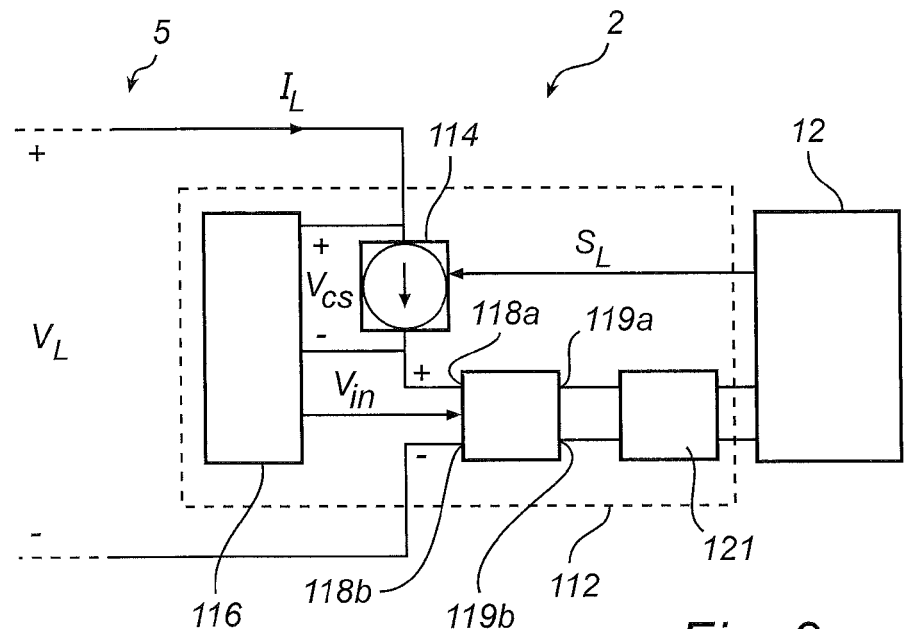

FIG. 2a is a block diagram schematically illustrating an exemplary embodiment of the loop-powered radar level gauge system 2 in FIG. 1a.

The radar level gauge system 2 in FIG. 2a comprises a measurement module 12 for determining the filling level, and loop interface circuitry 112 for providing a measurement signal $S_L$ indicative of the filling level to the two-wire current loop 5, and for providing power from the two-wire current loop 5 to the measurement module 12.

The loop interface circuitry 112 comprises current control circuitry in the form of a controllable current source 114, a first DC-DC converter 115 and voltage regulation circuitry 116.

During operation of the radar level gauge system 2, the controllable current source 114 is controlled by the measurement module 12 to provide the measurement signal $S_L$ to the two-wire current loop 5. The measurement signal $S_L$ may be in the form of a the loop current $I_L$ (a DC current level) and/or a an AC signal superimposed on the loop current $I_L$. An example of the latter case could be communication on a 4-20 mA current loop according to the HART-protocol.

In the exemplary case that is schematically illustrated in FIG. 2a, it is assumed that the measurement signal $S_L$ is provided in the form of a certain loop current $I_L$ between 4 mA and 20 mA.

The first DC-DC converter 115 has input terminals 118a-b and output terminals 119a-b, where the input terminals 118a-b are connected to the two-wire current loop 5 in series with the controllable current source 114, and the output terminals are connected to the measurement module 12 to provide power from the two-wire current loop 5 to the measurement module 12. The power from the two-wire 4-20 mA current loop 5 is the only external power that is provided to the radar level gauge system 2.

The voltage regulation circuitry 116 monitors the voltage $V_{cs}$ across the current source 114 and controls the input voltage $V_{in}$ of the first DC-DC converter to keep the voltage $V_{cs}$ across the current source 114 substantially constant at a predetermined value, such as 2 V, when the loop voltage $V_L$ varies. This may be realized in various ways by one of ordinary skill in the art. For example, the first converter 115 may be a switching converter of the so-called "buck/boost" type. Such a converter may, for example, be realized in the form of a so-called SEPIC converter, which is well known to electrical engineers. The input voltage of a SEPIC converter can be controlled by controlling a switching transistor in the converter, for example using pulse width modulation.

However, practically any switching converter may be used in the field device according to various embodiments of the present invention. For example, a forward converter or a flyback converter may be used.

On the output side of the converter 115, additional circuitry 121 may be provided, which may have different configurations depending on the desired function. Some examples of such additional circuitry 121 are described in detail in U.S. Pat. No. 8,477,064, which is hereby incorporated by reference in its entirety.

When a new measurement signal $S_L$ should be provided to the two-wire current loop 5, the controllable current source 114 is controlled by the measurement module 12 to provide a new loop current $I_L$ to the two-wire current loop. In order to modify the loop current $I_L$, the voltage $V_{cs}$ across the controllable current source should temporarily be allowed to be changed. However, the voltage regulation circuitry strives to keep the voltage $V_{cs}$ across the controllable current source 114 constant. To allow for rapid and accurate changes in the measurement signal, while at the same time keeping the voltage $V_{cs}$ across the controllable current source substantially constant over time, the control of the controllable current source 114 may preferably be faster (have a shorter time constant) than the control of the voltage $V_{in}$ across the input terminals 118a-b of the first converter 115.

Figure 2B:
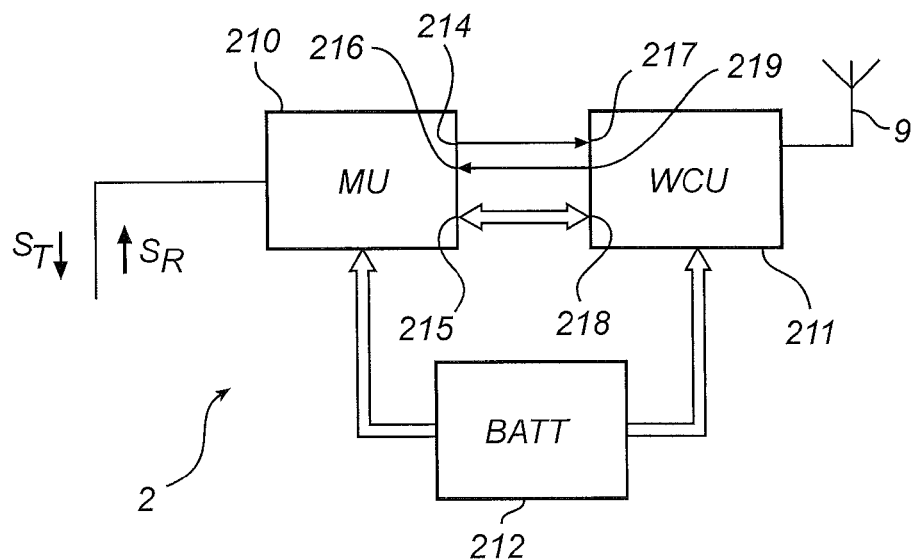
FIG. 2b is a block diagram schematically illustrating the radar level gauge system in FIG. 1b.

With reference to FIG. 2b, the second embodiment of the radar level gauge system 2 in FIG. 1b comprises a measurement unit (MU) 210, a wireless communication unit (WCU) 211 and a local energy store in the form of a battery 212. The wireless communication unit 211 may advantageously be compliant with WirelessHART (IEC 62591).

As is schematically indicated in FIG. 2b, the measurement unit 210 comprises a first output 214, a second output 215, and a first input 216. The first output 214 is connected to a first input 217 of the wireless communication unit 211 through a first dedicated discreet line, the second output 215 is connected to a second input 218 of the wireless communication unit 211, and the first input 216 is connected to a first output 219 of the wireless communication unit 211 through a second dedicated discreet line. The second output 215 of the measurement unit 210 and the second input 218 of the wireless communication unit 211 may be configured to handle bidirectional data communication according to a serial or a parallel communication protocol to allow exchange of data between the measurement unit 210 and the wireless communication unit 211. The communication between the measurement unit 210 and the wireless communication unit 211 using the different inputs/outputs is described in more detail in U.S. patent application Ser. No. 13/537,513, which is hereby incorporated by reference in its entirety.

The above examples of a 4-20 mA current loop configuration and a wireless and locally powered configuration are intended to give the skilled person detailed examples of how various aspects and embodiments of the radar level gauge system according to the present invention can be implemented. It should, however, be noted that there are many other ways of interfacing a radar level gauge system with a 4-20 mA current loop and many other ways of configuring and controlling a wireless radar level gauge system that is powered by a local energy store. Such other ways are widely accessible to one of ordinary skill in the art and can be implemented without excessive experimentation or undue burden.

Figure 3:
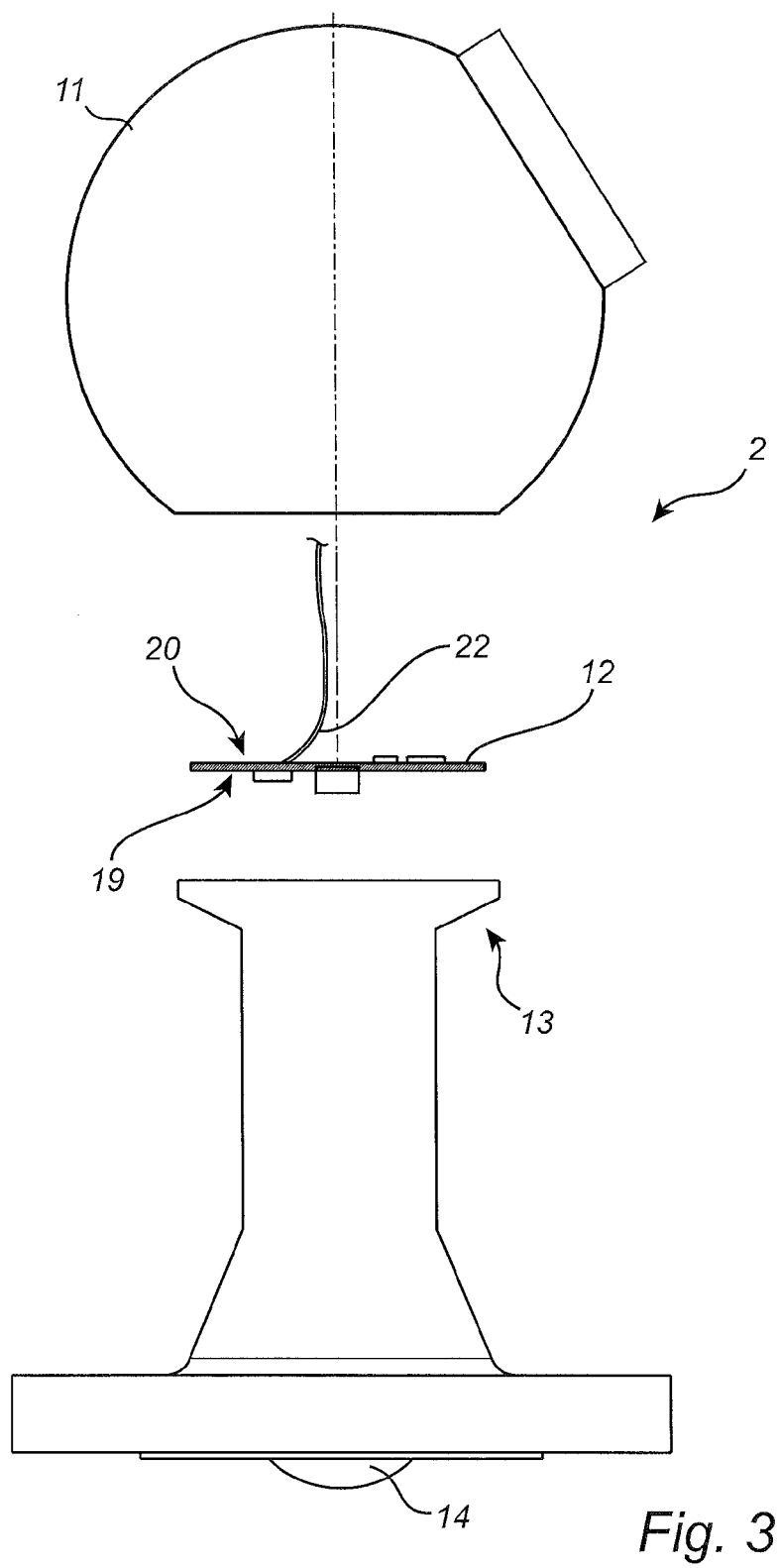
FIG. 3 is a schematic cross-section view of the radar level gauge system in FIGS. 1a-b.

Referring now to FIG. 3, which is a schematic and simplified exploded view of the radar level gauge system 2 in FIGS. 1a-b, the radar level gauge system 2 comprises, an upper housing part 11, a measurement module 12, a lower housing part 13, and a dielectric plug 14.

The lower housing part 13 comprises a waveguide portion and a conical antenna portion (not shown), and the dielectric plug is formed to fill up and seal the opening of the conical antenna portion and the waveguide portion.

The measurement module 12, which will be described in further detail below with reference to FIGS. 4a-b, has a microwave electronics side 19 and a measurement electronics side 20. On the microwave electronics side 19, the measurement module 12 comprises components for generating, transmitting and receiving electromagnetic measurement signals in the microwave frequency range, and a connector 21 for providing the transmitted signals to the wave guide of the lower housing part 13. Various components are schematically indicated as simple boxes in FIG. 2.

Figure 4A:
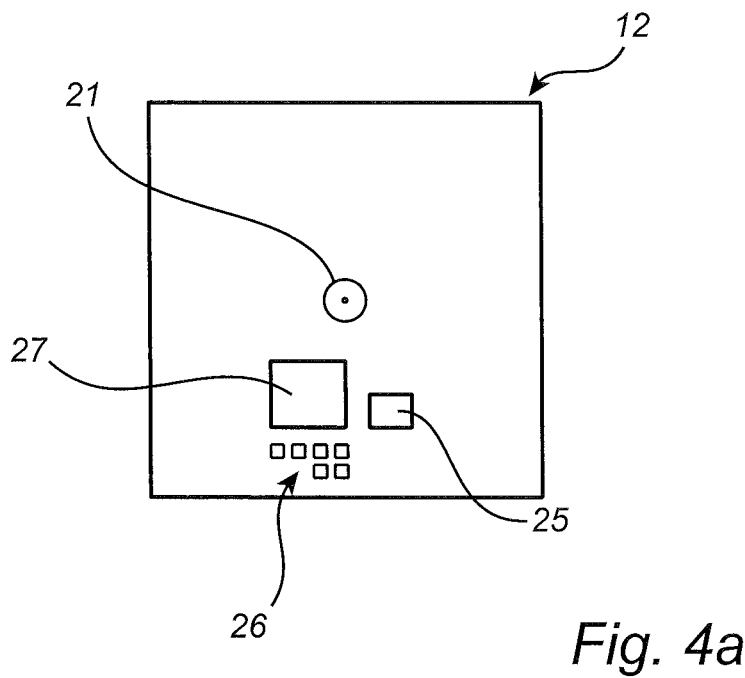

Referring now to FIG. 4a, which is a schematic plane view of the microwave electronics side 19 of the measurement module 12, the microwave electronics part—the transceiver—of the measurement module 12 comprises a crystal oscillator 25, components forming a low pass filter 26, and a chip radar component 27.

As is evident from FIG. 4a, the microwave electronics part of the measurement module 12 is very compact and is formed by very few components. This is a key factor for being able to design a very compact FMCW-type radar level gauge system 2. In particular, referring again briefly to FIG. 3, the upper housing part 11 and the lower housing part 13 can be made using considerably less material than was previously possible, resulting in a cheaper, more compact radar level gauge system.

Furthermore, providing most of the functionality of the transceiver in the chip radar component 27 improves the production yield of the measurement module 12 and practically removes the need for time-consuming component trimming and testing in production.

Figure 4B:
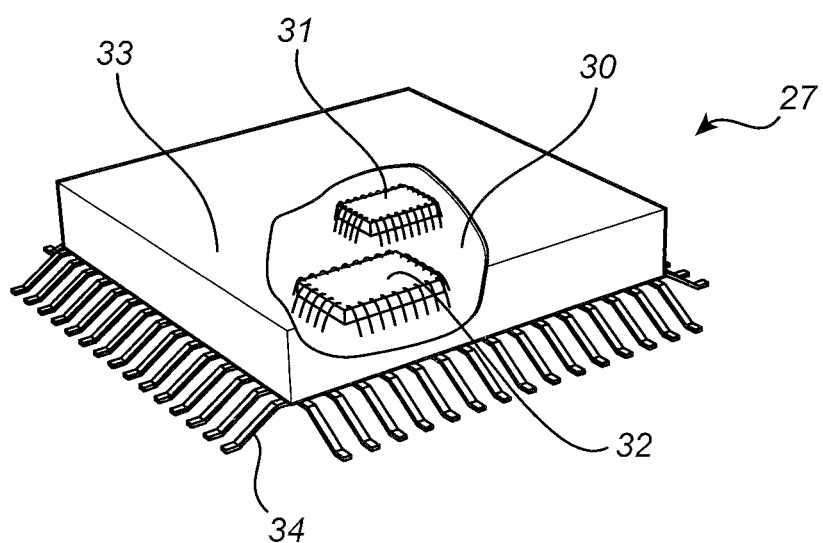

FIG. 4b schematically illustrates the chip radar component 27 that is mounted on the microwave electronics side 19 of the measurement module 12. As is schematically indicated in FIG. 4b, the chip radar component 27 is a QFP (quad flat pack) type component comprising a package substrate 30, a first IC 31, a second IC 32, an encapsulating material 33 and a plurality of pins 34 for connection of the chip radar component 27 to the measurement module 12.

The first IC 31 is an integrated PLL component which is wire-bonded to the package substrate 30. The integrated PLL component may, for example, be HMC 703 from Hittite or ADF 4158 from Analog Devices. The second IC 32, which is also wire-bonded to the package substrate 30, is a custom made application specific integrated microwave circuit comprising the microwave signal source and the mixer of the radar level gauge system 2. This integrated microwave circuit 32, which will be described in more detail below with reference to FIG. 4, has been designed to exhibit a phase noise in the range −70 dBc/Hz to −50 dBc/Hz @ 100 kHz offset from a carrier frequency for the microwave signal generated and transmitted by the integrated microwave circuit 32.

Figure 5:
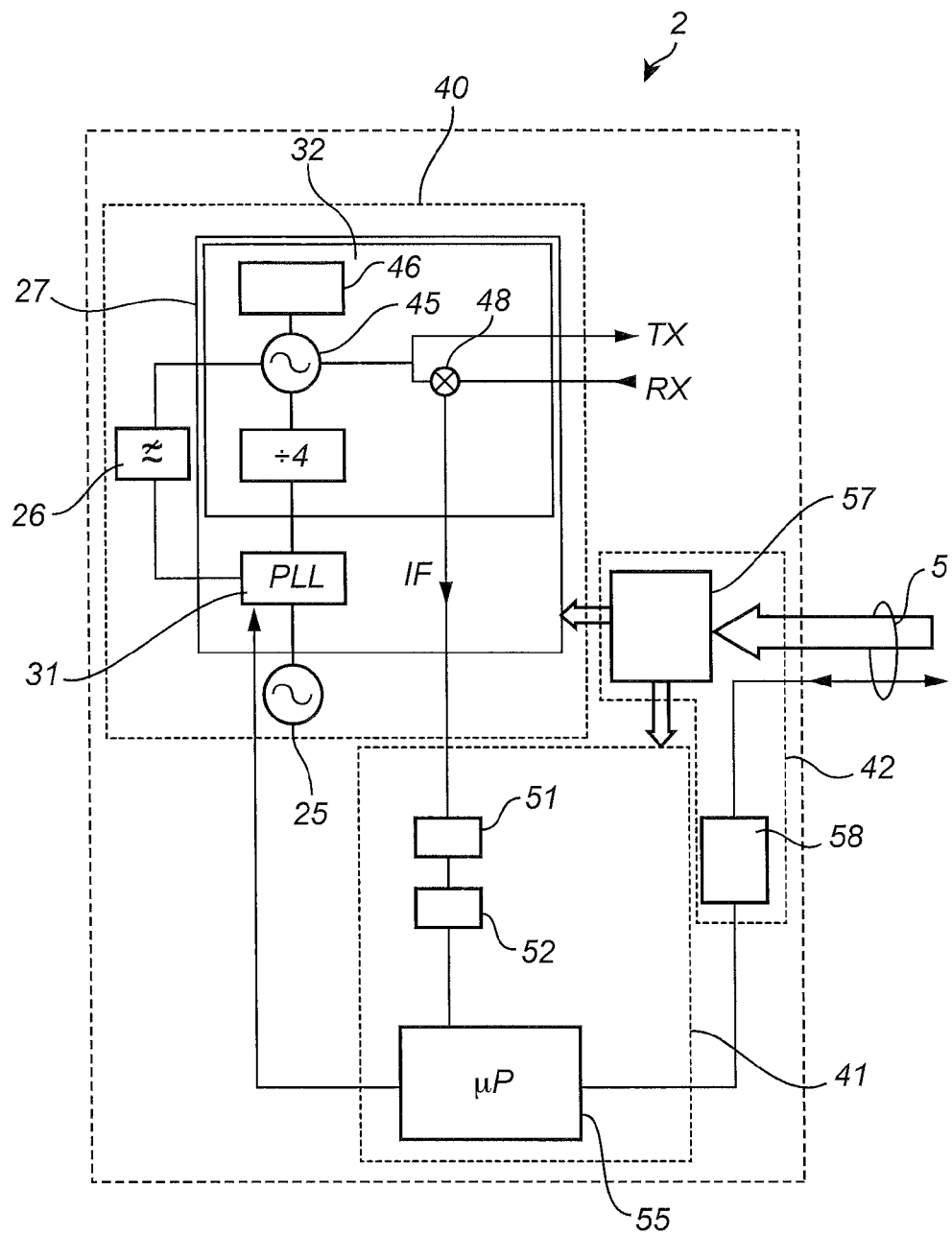
FIG. 5 is a schematic block diagram of the radar level gauge system in FIG. 3.

FIG. 5 is a schematic block diagram of the radar level gauge system 2 in FIG. 2. As previously described, the radar level gauge system 2 comprises microwave electronics 40 (on the microwave electronics side 19 of the measurement module 12), measurement electronics 41 (on the measurement electronics side 20 of the measurement module 12), and communication and power supply circuitry 42.

Referring to FIG. 5, the microwave electronics 40 comprises VCO (voltage controlled oscillator) 45, current supply circuitry 46, PLL 31, crystal oscillator 25, low-pass filter 26, and mixer 48.

The VCO 45, the current supply circuitry 46, and the mixer 48 are comprised in the integrated microwave circuit (MMIC) 32 (referring also to FIG. 3b). The PLL 31 and the MMIC 32 are included in the chip radar component 27, and the crystal oscillator 25 and the low pass filter 26 are provided as discrete components outside the chip radar component 27.

The measurement electronics 41 comprises sampler 51, ND-converter 52, and microprocessor 55.

The communication and power supply circuitry 42 comprises a power supply module 57 and a communication interface module 58.

In operation, the VCO 45 is controlled by a microwave signal source controller comprising the crystal oscillator 25, the PLL 31 and the low-pass filter to generate an electromagnetic transmit signal.

The current supply circuitry 46 is configured to bias the VCO 45 at an operating point at which the VCO 45 exhibits a phase noise in the range −70 dBc/Hz to −50 dBc/Hz @ 100 kHz offset from a carrier frequency for the transmit signal. This will allow more energy efficient operation of the VCO than in existing chip radar components at the expense of a higher phase noise. As has been previously mentioned, however, in the particular application of level gauging in tanks, sufficient (and high) sensitivity can be achieved even at a relatively high phase noise level due to the relatively short measurement distance.

As is schematically indicated in FIG. 5, the transmit signal TX is provided to the signal propagation circuitry (antenna or transmission line probe) which propagates the transmit signal TX towards the surface of the product 8 in the tank 7. The transmit signal TX is reflected at the surface, and a reflection signal RX is returned to the microwave electronics 40 of the radar level gauge system 2. In particular, the reflection signal RX is provided to the mixer 48, where the reflection signal RX is combined with the transmit signal TX to form an intermediate frequency signal IF.

The intermediate frequency signal IF is routed from the microwave electronics 40 to the measurement electronics 41, where the signal IF is sampled by sampler 51 and the sampled signal values are converted to digital form by the A/D-converter 52 before being provided to the microprocessor 55, where the filling level is determined. In addition to determining the filling level, the microprocessor 55 controls the PLL 31 and communicates with a remote device via the communication interface module 58.

In the radar level gauge system 2 of FIG. 5, the PLL 31 and the sampler 51 (and the A/D-converter 52) are independently controllable, so that the microprocessor 55 can control the PLL 31 to in turn control the VCO 45 to generate frequency steps with a certain time duration $t_{step}$, and at the same time control sampling to take place with a sampling interval $t_{sample}$ that is different from the time duration $t_{step}$ of the frequency steps.

Moreover, the microprocessor may store, internally or externally, parameters corresponding to different sweep modes. Such different sweep modes may, for example, be adapted for different measurement ranges L. The microprocessor 55 may receive a command via the communication interface 58 to switch to a different sweep mode. In response, the microprocessor 55 may then access the stored parameters related to the requested sweep mode, and control at least the PLL 31 in accordance with the new parameters.

Examples of sweep mode parameters are provided in the table below:

| Measurement range (L) | Bandwidth (B) | Sweep time ($t_{sweep}$) |
|---|---|---|
| 20 meters | 2 GHz | 4-5 ms |
| 40 meters | 1 GHz | 4-5 ms |

The microwave electronics 40 and the measurement electronics 41 are powered via the power supply module 57, which may advantageously comprise an energy store, such as one or several capacitor(s) for storing energy when energy is available on the current loop 5 and providing energy to the microwave electronics 40 and/or the measurement electronics 41 when more energy is required than is available on the current loop 5.

Due to the limited energy storage capability of a capacitor or similar, the supply voltage from the power supply module 57 to the microwave electronics may decrease as a result of current being drawn from the power supply module 57. This effect is schematically indicated in FIG. 5. During a measurement operation, the output voltage from the power supply module 57 may, referring to FIG. 5, decrease from $V_{start}$ to $V_{end}$.

Figure 6:
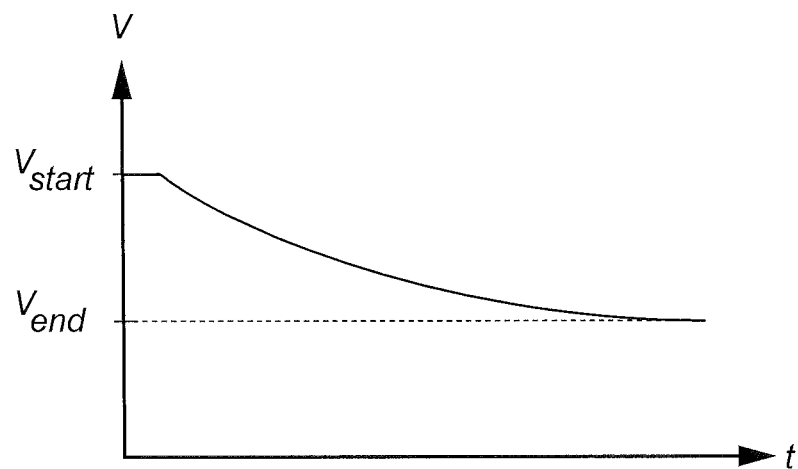
FIG. 6 is a diagram schematically illustrating the available voltage level during a measurement sweep in an example embodiment.

Depending on the amount of energy stored in the power supply module 57, the voltage $V_{end}$ at the end of the measurement operation may not be sufficient to control the VCO 45 to generate the highest frequency ($f_1$ in FIG. 6) of the measurement frequency sweep.

Therefore, in embodiments of the present invention, the VCO 45 may be controlled to generate the transmit signal TX as a frequency sweep from a high frequency $f_1$ to a low frequency $f_2$, instead of in the conventional manner from a low frequency to a high frequency. This will decrease the risk of incorrect frequencies being generated due to a depleted energy store.

Figure 7:
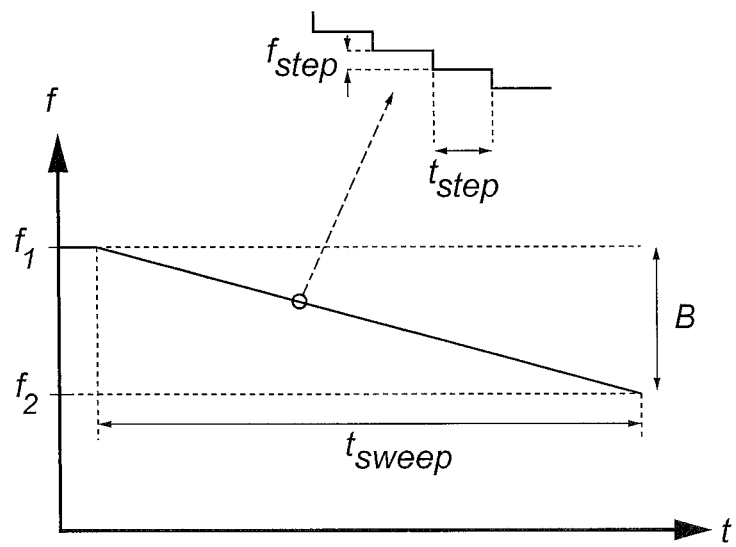
FIG. 7 is a diagram schematically illustrating a measurement sweep according to an example embodiment of the present invention.

In FIG. 7, a measurement sweep is shown comprising a time sequence of discrete and mutually different frequency steps, defining a bandwidth B of the transmit signal TX. Referring to FIG. 7, the bandwidth $B=f_1-f_2$. The time duration $t_{sweep}$ of the measurement sweep is less than 10 ms. The duration of each frequency step is, as is indicated in FIG. 7, $t_{step}$, and the frequency difference between adjacent (in terms of frequency) frequency steps is $f_{step}$.

Due to the relatively short distance from the radar level gauge system 2 to the surface of the product 8 in the tank 7 (compared to the speed of light), the reflection signal RX will (almost) always have the same frequency as the stepped transmit signal TX, but with (in this case) decreasing phase difference from the start of the measurement sweep to the end of the measurement sweep.

Figure 8:
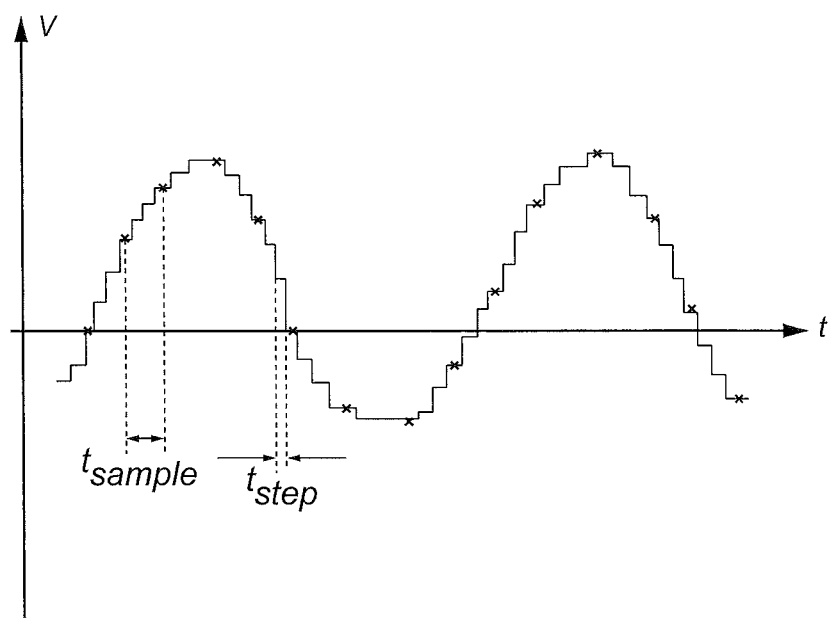
FIG. 8 is a diagram schematically illustrating the intermediate frequency signal that is sampled in order to determine the filling level.

This decreasing phase difference will correspond to the frequency difference that would have been obtained using continuous FMCW, and the intermediate frequency signal IF will, in the time domain, look like the stepped sine wave schematically shown in FIG. 8.

In the exemplary case illustrated by the IF-signal in FIG. 8, the PLL 31 has been controlled to, in turn, control the VCO 45 to generate frequency steps with a step time $t_{step}$, and the sampler 51 has been controlled to sample the IF-signal with a sampling interval $t_{sample}$ between consecutive sampling times that is considerably longer than the step time $t_{step}$. This may be advantageous since the generation of the transmit signal TX with a relatively short step time $t_{step}$ does not "cost" much extra power while considerably reducing the risk of "false echoes" due to distortion of the IF-signal. On the other hand, the sampling frequency can be kept down (the sampling interval $t_{sample}$ kept longer) to reduce the power consumption of the measurement electronics 41.

The person skilled in the art realizes that the present invention by no means is limited to the preferred embodiments described above. On the contrary, many modifications and variations are possible within the scope of the appended claims.

What is claimed is:

1. A radar level gauge system for determining the filling level of a product in a tank, comprising:
    a signal propagation device arranged to propagate an electromagnetic transmit signal towards a surface of the product and to return an electromagnetic reflection signal resulting from reflection of the electromagnetic transmit signal at the surface;
a microwave signal source coupled to said signal propagation device and controllable to generate said electromagnetic transmit signal;
a microwave signal source controller coupled to said microwave signal source and configured to control said microwave signal source to generate said transmit signal in the form of a measurement sweep comprising a time sequence of discrete and mutually different frequency steps defining a bandwidth of said transmit signal;
a mixer coupled to said microwave signal source and to said signal propagation device, and configured to combine said transmit signal and said reflection signal to form an intermediate frequency signal;
a sampler coupled to said mixer and configured to sample said intermediate frequency signal at a plurality of sampling times during said measurement sweep; and
processing circuitry coupled to said mixer and configured to determine said filling level based on said intermediate frequency signal,
wherein said microwave signal source controller and said sampler are controllable independently of each other, in such a way that a duration of each of the frequency steps comprised in said measurement sweep can be made different from a sampling time interval between consecutive ones of said sampling times.

2. The radar level gauge system according to claim 1, wherein the duration of each of said frequency steps is substantially shorter than said sampling time interval.

3. The radar level gauge system according to claim 1, wherein said microwave signal source controller comprises PLL circuitry.

4. The radar level gauge system according to claim 3, wherein said PLL circuitry is controllable to automatically generate said measurement sweep, and said processing circuitry is configured to control said PLL circuitry to automatically generate said measurement sweep.

5. The radar level gauge system according to claim 1, wherein said measurement sweep has a time duration of less than 10 ms.

6. The radar level gauge system according to claim 5, wherein said measurement sweep has a time duration of less than 5 ms.

7. The radar level gauge system according to claim 1, wherein said bandwidth of the transmit signal is at least 2.5 GHz.

8. The radar level gauge system according to claim 1, wherein said radar level gauge system is configured to provide a first transmit signal having a first carrier frequency, such as around 6 GHz, and a second transmit signal having a second carrier frequency being at least 1.5 times higher than said first transmit signal, such as around 24 GHz.

9. The radar level gauge system according to claim 1, wherein said radar level gauge system is controllable between an active state in which said microwave signal source is controlled to generate said transmit signal, and an idle state in which no transmit signal is generated.

10. The radar level gauge system according to claim 9, further comprising an energy store configured to store energy when the radar level gauge system is in said idle state and provide energy to said microwave signal source when the radar level gauge system is in said active state.

11. The radar level gauge system according to claim 1, wherein at least said microwave signal source and said mixer are comprised in an integrated microwave circuit.

12. The radar level gauge system according to claim 11, wherein said microwave signal source is configured to exhibit a phase noise greater than or equal to −70 dBc/Hz @ 100 kHz offset from a carrier frequency for said transmit signal.

13. The radar level gauge system according to claim 11, wherein said microwave signal source is configured to exhibit a phase noise smaller than −50 dBc/Hz @ 100 kHz offset from a carrier frequency for said transmit signal.

14. The radar level gauge system according to claim 11, wherein said microwave signal source comprises a voltage controlled oscillator.

15. The radar level gauge system according to claim 14, further comprising current supply circuitry configured to maintain said voltage controlled oscillator at such an operating point that a phase noise of said voltage controlled oscillator is in the range of −70 dBc/Hz to −50 dBc/Hz @ 100 kHz offset from a carrier frequency for said transmit signal.

16. The radar level gauge system according to claim 15, wherein said current supply circuitry is comprised in said integrated microwave circuit.

17. The radar level gauge system according to claim 1, further comprising loop interface circuitry for providing a measurement signal indicative of said filling level to a two-wire 4-20 mA current loop and for providing power from said two-wire current loop to said radar level gauge system, said two-wire 4-20 mA current loop being the only source of external power for the radar level gauge system.

18. The radar level gauge system according to claim 1, further comprising:
a wireless communication unit connected to said processing circuitry for retrieving said filling level from said processing circuitry and wirelessly transmitting said measurement signal to a remote device; and
a local energy store for supplying energy sufficient for operation of said radar level gauge system.

19. A radar level gauge system for determining the filling level of a product in a tank, comprising:
a signal propagation device arranged to propagate an electromagnetic transmit signal towards a surface of the product and to return an electromagnetic reflection signal resulting from reflection of the electromagnetic transmit signal at the surface;
a microwave signal source coupled to said signal propagation device and controllable to generate said electromagnetic transmit signal;
a local energy store configured to store energy at times when no transmit signal is generated and to provide energy to said microwave signal source when said transmit signal is generated;
a microwave signal source controller coupled to said microwave signal source and configured to control said microwave signal source to generate said transmit signal in the form of a measurement sweep starting at a first frequency being the highest frequency of the measurement sweep when said local energy store is capable of providing a first voltage, and ending at a second frequency being the lowest frequency of the measurement sweep when said local energy store has been partly discharged and is capable of providing a second voltage lower than said first voltage;
a mixer coupled to said microwave signal source and to said signal propagation device, and configured to combine said transmit signal and said reflection signal to form an intermediate frequency signal; and
processing circuitry coupled to said mixer and configured to determine said filling level based on said intermediate frequency signal.

20. The radar level gauge system according to claim 19, wherein said measurement sweep comprises a time sequence of discrete and mutually different frequency steps defining a bandwidth of said transmit signal.

21. The radar level gauge system according to claim 19, wherein said measurement sweep has a time duration of less than 10 ms.

22. The radar level gauge system according to claim 21, wherein said measurement sweep has a time duration of less than 5 ms.

23. The radar level gauge system according to claim 19, wherein said bandwidth of the transmit signal is at least 2.5 GHz.

24. The radar level gauge system according to claim 19, wherein said radar level gauge system is configured to provide a first transmit signal having a first carrier frequency, such as around 6 GHz, and a second transmit signal having a second carrier frequency being at least 1.5 times higher than said first transmit signal, such as around 24 GHz.

25. The radar level gauge system according to claim 19, wherein at least said microwave signal source and said mixer are comprised in an integrated microwave circuit.

26. The radar level gauge system according to claim 25, wherein said microwave signal source is configured to exhibit a phase noise greater than or equal to −70 dBc/Hz @ 100 kHz offset from a carrier frequency for said transmit signal.

27. The radar level gauge system according to claim 25, wherein said microwave signal source is configured to exhibit a phase noise smaller than −50 dBc/Hz @ 100 kHz offset from a carrier frequency for said transmit signal.

28. The radar level gauge system according to claim 25, wherein said microwave signal source comprises a voltage controlled oscillator.

29. The radar level gauge system according to claim 25, further comprising current supply circuitry configured to maintain said voltage controlled oscillator at such an operating point that a phase noise of said voltage controlled oscillator is in the range of −70 dBc/Hz to −50 dBc/Hz @ 100 kHz offset from a carrier frequency for said transmit signal.

30. The radar level gauge system according to claim 29, wherein said current supply circuitry is comprised in said integrated microwave circuit.

31. The radar level gauge system according to claim 19, further comprising loop interface circuitry for providing a measurement signal indicative of said filling level to a two-wire 4-20 mA current loop and for providing power from said two-wire current loop to said radar level gauge system, said two-wire 4-20 mA current loop being the only source of external power for the radar level gauge system.

32. The radar level gauge system according to claim 19, further comprising:
a wireless communication unit connected to said processing circuitry for retrieving said filling level from said processing circuitry and wirelessly transmitting said measurement signal to a remote device; and
a local energy store for supplying energy sufficient for operation of said radar level gauge system.

33. A radar level gauge system for determining the filling level of a product in a tank, said radar level gauge system being controllable between at least a first measurement mode and a second measurement mode, said radar level gauge system comprising:
a signal propagation device arranged to propagate an electromagnetic transmit signal towards a surface of the product and to return an electromagnetic reflection signal resulting from reflection of the electromagnetic transmit signal at the surface;
a microwave signal source coupled to said signal propagation device and controllable to generate said electromagnetic transmit signal;
a microwave signal source controller coupled to said microwave signal source and configured to:
control, when said radar level gauge system is in said first measurement mode, said microwave signal source to generate a first measurement sweep having a first time duration and a first bandwidth; and
control, when said radar level gauge system is in said second measurement mode, said microwave signal source to generate a second measurement sweep having a second time duration and a second bandwidth, at least one of said second time duration and said second bandwidth being substantially different from said first time duration and said first bandwidth, respectively;
a mixer coupled to said microwave signal source and to said signal propagation device, and configured to combine said transmit signal and said reflection signal to form an intermediate frequency signal; and
processing circuitry coupled to said mixer and configured to determine said filling level based on said intermediate frequency signal.

34. The radar level gauge system according to claim 33, wherein said second bandwidth is at least 1.5 times said first bandwidth.

35. The radar level gauge system according to claim 33, wherein said measurement sweep comprises a time sequence of discrete and mutually different frequency steps defining a bandwidth of said transmit signal.

36. The radar level gauge system according to claim 33, wherein said measurement sweep has a time duration of less than 10 ms.

37. The radar level gauge system according to claim 36, wherein said measurement sweep has a time duration of less than 5 ms.

38. The radar level gauge system according to claim 33, wherein said bandwidth of the transmit signal is at least 2.5 GHz.

39. The radar level gauge system according to claim 33, wherein said radar level gauge system is configured to provide a first transmit signal having a first carrier frequency, such as around 6 GHz, and a second transmit signal having a second carrier frequency being at least 1.5 times higher than said first transmit signal, such as around 24 GHz.

40. The radar level gauge system according to claim 33, wherein at least said microwave signal source and said mixer are comprised in an integrated microwave circuit.

41. The radar level gauge system according to claim 40, wherein said microwave signal source is configured to exhibit a phase noise greater than or equal to −70 dBc/Hz @ 100 kHz offset from a carrier frequency for said transmit signal.

42. The radar level gauge system according to claim 40, wherein said microwave signal source is configured to exhibit a phase noise smaller than −50 dBc/Hz @ 100 kHz offset from a carrier frequency for said transmit signal.

43. The radar level gauge system according to claim 40, wherein said microwave signal source comprises a voltage controlled oscillator.

44. The radar level gauge system according to claim 40, further comprising current supply circuitry configured to maintain said voltage controlled oscillator at such an operating point that a phase noise of said voltage controlled oscillator is in the range of −70 dBc/Hz to −50 dBc/Hz @ 100 kHz offset from a carrier frequency for said transmit signal.

45. The radar level gauge system according to claim 44, wherein said current supply circuitry is comprised in said integrated microwave circuit.

46. The radar level gauge system according to claim 33, further comprising loop interface circuitry for providing a measurement signal indicative of said filling level to a two-wire 4-20 mA current loop and for providing power from said two-wire current loop to said radar level gauge system, said two-wire 4-20 mA current loop being the only source of external power for the radar level gauge system.

47. The radar level gauge system according to claim 33, further comprising:
- a wireless communication unit connected to said processing circuitry for retrieving said filling level from said processing circuitry and wirelessly transmitting said measurement signal to a remote device; and
- a local energy store for supplying energy sufficient for operation of said radar level gauge system.

* * * * *